United States Patent
Cardinale et al.

(10) Patent No.: US 11,691,402 B2
(45) Date of Patent: Jul. 4, 2023

(54) POLYESTER TEREPHTHALATE RIGID WADDING DISPOSED BETWEEN SURFACE LAMINATIONS

(71) Applicants: Sal Jack Cardinale, Mill Valley, CA (US); Sean McCoy, Mill Valley, CA (US); Richard Ben Scott, Mill Valley, CA (US)

(72) Inventors: Sal Jack Cardinale, Mill Valley, CA (US); Sean McCoy, Mill Valley, CA (US); Richard Ben Scott, Mill Valley, CA (US)

( * ) Notice: Subject to any disclaimer, the term of this patent is extended or adjusted under 35 U.S.C. 154(b) by 0 days.

(21) Appl. No.: 15/442,526

(22) Filed: Feb. 24, 2017

(65) Prior Publication Data

US 2019/0100371 A1   Apr. 4, 2019

Related U.S. Application Data

(60) Provisional application No. 62/299,471, filed on Feb. 24, 2016.

(51) Int. Cl.
*B32B 27/36* (2006.01)
*B32B 27/08* (2006.01)
*B65D 81/38* (2006.01)
*B32B 27/12* (2006.01)
(Continued)

(52) U.S. Cl.
CPC ............ *B32B 27/36* (2013.01); *B32B 27/08* (2013.01); *B65D 81/3858* (2013.01); *B65D 81/3897* (2013.01); *B32B 5/06* (2013.01); *B32B 7/04* (2013.01); *B32B 27/12* (2013.01); *B32B 2250/03* (2013.01); *B32B 2250/244* (2013.01); *B32B 2250/40* (2013.01); *B32B 2262/0276* (2013.01); *B32B 2262/0284* (2013.01); *B32B 2307/304* (2013.01); *B32B 2367/00* (2013.01); *B32B 2439/00* (2013.01);
(Continued)

(58) Field of Classification Search
None
See application file for complete search history.

(56) References Cited

U.S. PATENT DOCUMENTS 3,170,832 A    2/1965  Wilson et al.
3,772,137 A *  11/1973  Tolliver ................. A47C 27/12
                                                         425/382.2
(Continued)

OTHER PUBLICATIONS

"Dossier—Plastic Recycling" (Nov. 2014). (Year: 2014).*
(Continued)

*Primary Examiner* — Vivian Chen
(74) *Attorney, Agent, or Firm* — Steven A. Nielsen; www.NielsenPatents.com

(57) ABSTRACT

Rigid wadding, insulation and packaging for food and other products is made of homogeneous polyester terephthalate (PET) that satisfies the resin recycling identification code number one. For purposes of protecting an inner rigid wadding or other insulation, one or more film strips or film coatings may be applied by the artful use of amorphous (non-crystalized) PET that melts at a lower temperature and can act as a thermal bond adhesive. The film strips or film coatings may be made of homogeneous polyester terephthalate (PET) that satisfies the resin recycling identification code number one.

3 Claims, 5 Drawing Sheets

(51) Int. Cl.
    *B32B 5/06*     (2006.01)
    *B32B 7/04*     (2019.01)

(52) U.S. Cl.
    CPC .... *B32B 2439/70* (2013.01); *B65D 2565/385* (2013.01); *Y02W 30/80* (2015.05)

(56) References Cited

U.S. PATENT DOCUMENTS

| | | | | |
|---|---|---|---|---|
| 4,395,455 | A * | 7/1983 | Frankosky | A41D 31/02 |
| | | | | 428/332 |
| 5,506,036 | A | 4/1996 | Bergerioux | |
| 5,508,075 | A | 4/1996 | Roulin et al. | |
| 5,526,341 | A * | 6/1996 | Shiba | G11B 7/26 |
| | | | | 369/275.3 |
| 5,582,905 | A * | 12/1996 | Beck | B32B 5/26 |
| | | | | 428/74 |
| 5,723,209 | A * | 3/1998 | Borger | F16L 59/026 |
| | | | | 442/364 |
| 5,820,268 | A * | 10/1998 | Becker | B65D 5/3685 |
| | | | | 383/99 |
| 7,000,729 | B2 | 2/2006 | Jacobsen | |
| 7,182,985 | B1 | 2/2007 | Ghisolfi | |
| 7,318,498 | B2 | 1/2008 | Woodman et al. | |
| 7,754,120 | B2 | 7/2010 | Kessing | |
| 9,688,454 | B2 | 6/2017 | Ranade | |
| 2003/0003249 | A1* | 1/2003 | Benim | B65D 81/3886 |
| | | | | 156/251 |
| 2003/0047564 | A1* | 3/2003 | Veiseh | B65D 81/3851 |
| | | | | 220/592.26 |
| 2003/0187417 | A1* | 10/2003 | Kudo | A61F 13/15617 |
| | | | | 604/367 |
| 2004/0120611 | A1* | 6/2004 | Kannankeril | B65D 31/10 |
| | | | | 383/110 |
| 2007/0051782 | A1* | 3/2007 | Lantz | B65D 5/0005 |
| | | | | 229/103.11 |
| 2007/0256379 | A1 | 11/2007 | Edwards | |
| 2008/0078770 | A1* | 4/2008 | Thomas | B65D 81/3862 |
| | | | | 220/592.2 |
| 2009/0186545 | A1 | 6/2009 | Hwang et al. | |
| 2009/0188091 | A1* | 7/2009 | Van Kerrebrouck | D04H 1/60 |
| | | | | 28/108 |
| 2014/0319018 | A1* | 10/2014 | Collison | B65D 81/127 |
| | | | | 206/589 |
| 2017/0369226 | A1* | 12/2017 | Chase | B65D 81/3848 |

OTHER PUBLICATIONS

"University of Michigan—New Recycling Labels" ("http://mrecycle.blogspot.com/2015/06/new-recycling-labels.html") (Jun. 10, 2015). (Year: 2015).*

Free Dictionary—Pure, (https://www.thefreedictionary.com/pure) (webpage retrieved Dec. 16, 2022) (Year: 2022).*

Whelan, Tony, Polymer Technology Dictionary, p. 475. (1994) (Year: 1994).*

Gooch, J.W. (eds) Encyclopedic Dictionary of Polymers. Springer, New York, NY. "Virgin material" (https://doi.org/10.1007/978-0-387-30160-0_12340) (2007) (Year: 2007).*

* cited by examiner

POLYESTER TEREPHTHALATE RIGID WADDING DISPOSED BETWEEN SURFACE LAMINATIONS

RELATED PATENT APPLICATION AND INCORPORATION BY REFERENCE

This is a utility application based upon U.S. patent application Ser. No. 62/299,471 filed on Feb. 24, 2016. This related application is incorporated herein by reference and made a part of this application. If any conflict arises between the disclosure of the invention in this utility application and that in the related provisional application, the disclosure in this utility application shall govern. Moreover, the inventor (s) incorporate herein by reference any and all patents, patent applications, and other documents hard copy or electronic, cited or referred to in this application.

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION

(1) Field of the Invention

The invention generally relates to insulation systems. More particularly, the invention relates to the use of polyester terephthalate wadding bonded between surface laminations made of terephthalate film.

(2) Description of the Related Art

Various means and methods of making and using insulation are known in the prior art and include:
U.S. Pat. No. 3,170,832 issued to Wilson et al on Feb. 23, 1965 discloses various polyester resin laminated products. U.S. Pat. No. 5,506,036 issued to Bergerioux on Apr. 9, 1996 discloses various laminated materials used for packaging. U.S. Pat. No. 5,508,075 issued to Roulin et al on Apr. 16, 1996 discloses packaging laminate useful for the suppression of gasses and aroma. U.S. Pat. No. 7,182,985 issued to Ghisolfi on Feb. 27, 2007 discloses multi-layer polyester resin that is purportedly recyclable and useful for the fabrication of beverage and food containers.

While the prior art does disclose various forms of polyester in the manufacture of food storage or insulation products, the prior art fails to provide a number one PET recycling rating, as the prior art's use of impurities makes the prior art food storage solutions less than truly recyclable.

BRIEF SUMMARY OF THE INVENTION

The disclosed embodiments overcome shortfalls in the related art by presenting an unobvious and unique combination, configuration and use of pure polyester terephthalate configured into rigid wadding, with the rigid wadding bonded between surface laminations comprised of pure polyester terephthalate film. The disclosed embodiments include the use of polyesters such as polyethylene terephthalate.

The disclosed embodiments may include new means of bonding film to wadding as well as the artful integration of disclosed components into shipping containers.

The disclosed embodiments include a new "T" shaped form factor used in insulating boxes and other containers. Disclosed embodiments overcome shortfalls in the art by use of sealed seams, gusset configurations, AB box liner components and other components.

Figure 1:
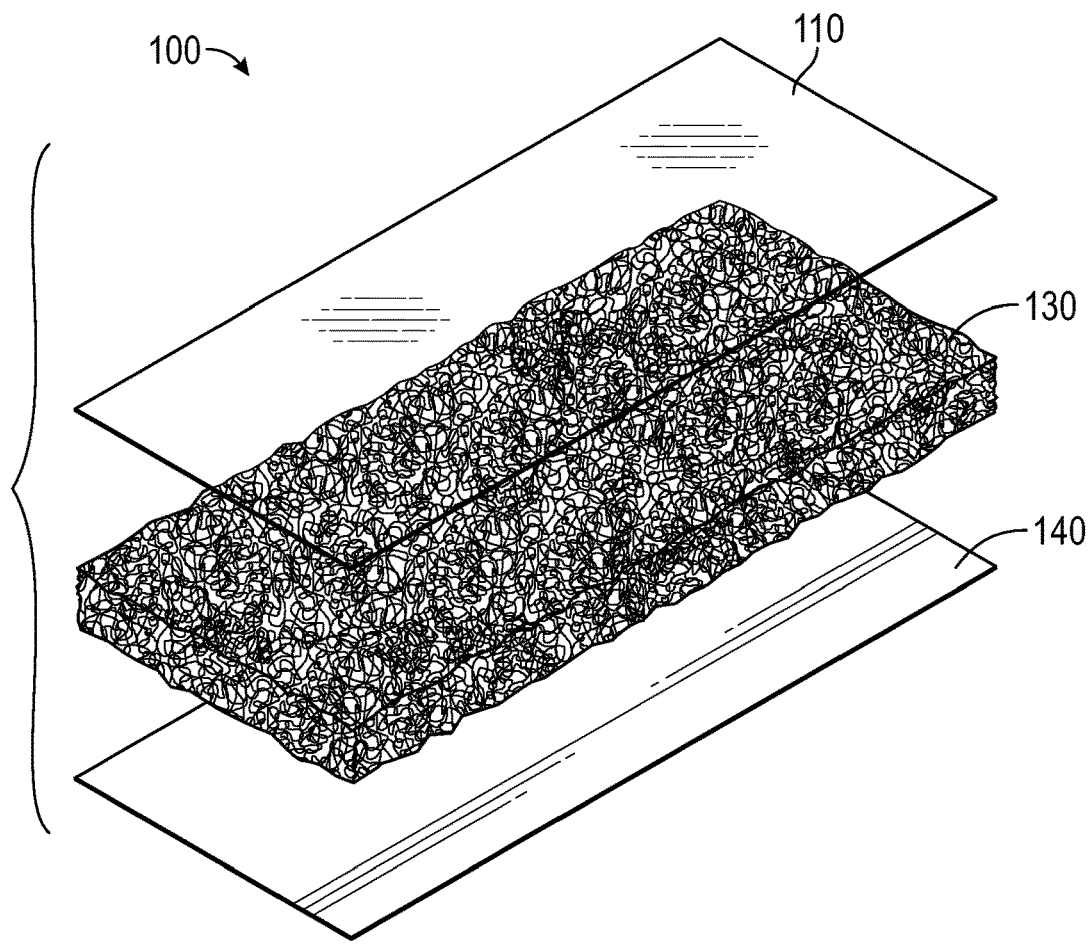
FIG. 1 is a perspective view of a laminate system

REFERENCE NUMERALS IN THE DRAWINGS 100 laminate system
110 first film of a laminate system 100
130 rigid wadding of a laminate system 100
140 second film of a laminate system 100
200 bottom gusset of box liner
210 first vertical side of bottom gusset
220 first downward arch of bottom gusset
225 first inner vertical wall
230 inner arch
235 second inner vertical wall
240 second downward arch
250 second vertical side of bottom gusset
300 AB box liner system
310 "L" shaped component of the AB box liner system
320 "U" shaped component of the AB box liner system
400 bottom gusset liner in a closed position
410 cut lines upon a bottom gusset liner in a closed position
430 bottom gusset liner in an open or expanded position
435 optional adhesive closure strip
500 "T" shaped embodiment
510 interior insulation material
520 planar siding on either side of interior insulation material
600 upper flap
610 center section
620 left flap
630 right flap
640 continuous lower flap and upper cover
700 container or packing box These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

Referring to FIG. 1, a polyester rigid wadding system 100 is shown with a first film 110 attached to a rigid wadding structure 130 and a second film 140 also attached to the rigid wadding structure 130. The rigid wadding structure 130 and first and second films may be made of homogeneous polyester terephthalate (PET) such that the entire structure enjoys recycling identification code number one. In order to construct a disclosed laminate system 100 the two inner sides of the film strips may comprise amorphous (non-crystalized) PET. The amorphous sides of the film strips may be heated and thus adhere to the two outer sides of the rigid wadding. This method of using amorphous (non-crystalized) PET to thermally bond the film strips to the rigid wadding overcomes shortfalls in the prior art in that the disclosed method of attachment keeps the overall structure within the chemical boundaries of resin recycling identification code number one as no impurities are introduced. The disclosed use of amorphous (non-crystalized) PET upon the inner sides of the film strips allows for a relatively lower melting temperature to thermally bond the strips to the rigid wadding so as to not compromise the structural integrity of the rigid wadding.

The resulting disclosed structure may be manufactured in continuous sheets wherein low heat is applied to thermally bond the film strips to the upper and lower sides of the rigid wadding. The disclosed use and attachment of film to the rigid wadding overcomes shortfalls in the art by providing a protective film upon the rigid wadding to prevent fraying and other frictional damage to the rigid wadding. The disclosed application of film to the rigid wadding overcomes shortfalls in the art by providing smooth outward surfaces such that the insulation sheets may be slideably stacked and unstacked without snags or undue friction.

Figure 2:
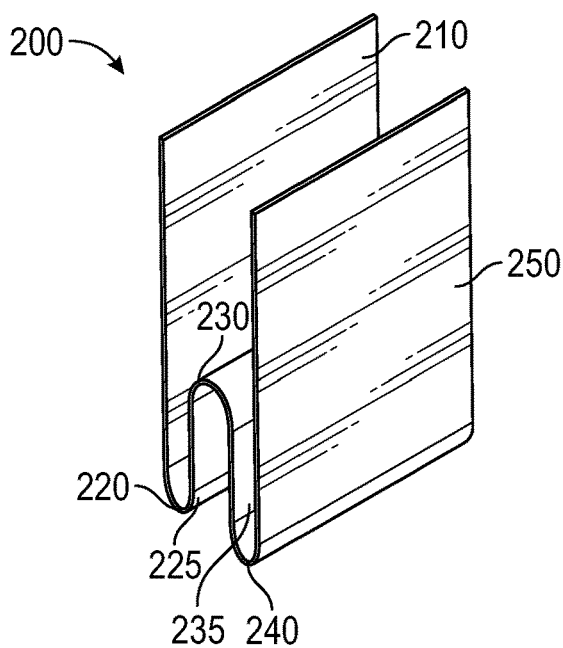
FIG. 2 is a perspective view of a bottom gusset
Figures 3, 4:
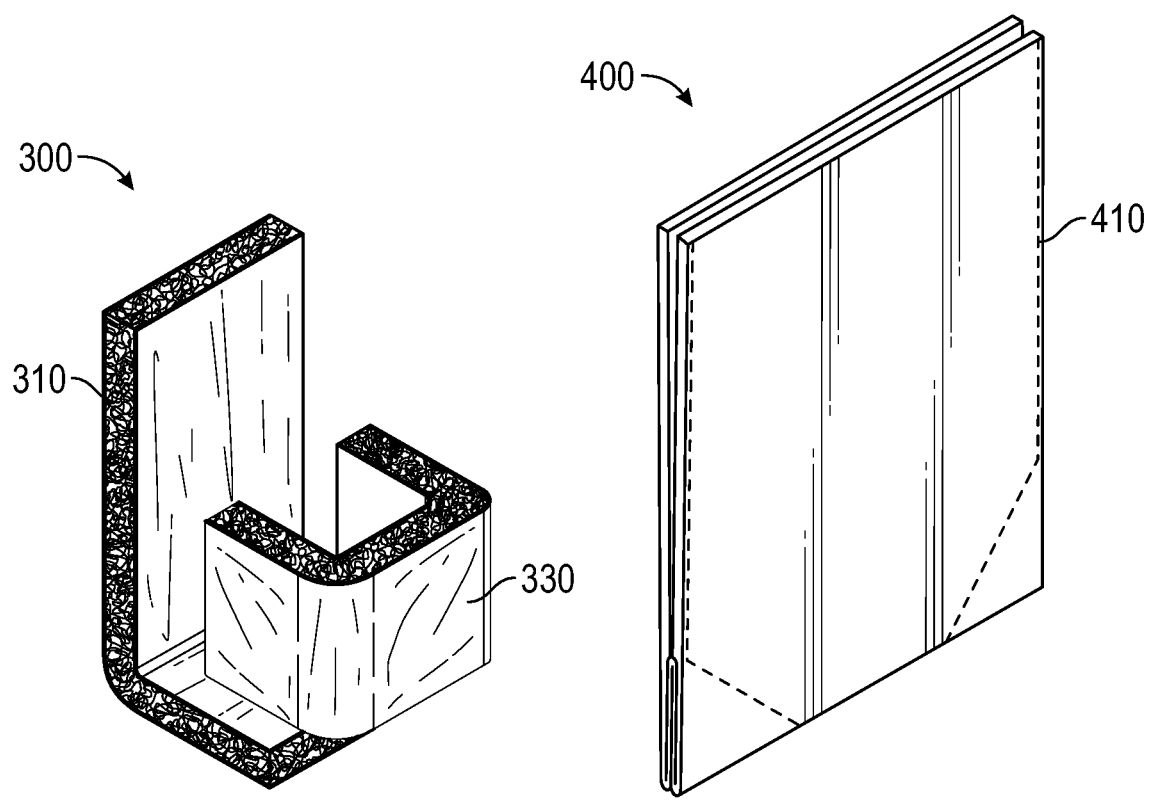
FIG. 3 is a perspective view of AB box liner components
FIG. 4 is a perspective view of box liner components in a folded position

Referring to FIG. 2, a perspective view of a bottom gusset 200 is shown and may be made of the structure shown in FIG. 1 and discussed above. A bottom gusset 200 may comprise an artful configuration comprising a first vertical side 210 or wall transitioning at a first downward arch 220, further transitioning to a first inner vertical wall 225, with the first inner vertical wall 225 transitioning or attached to an inner arch 230, from the inner arch 230 the structure of laminate may transition downwardly or be attached to a second inner vertical wall 235, with the second inner vertical wall 235 transitioning to a second arch 240, with the second arch attached to or transitioning and to a second vertical side 250. The disclosed bottom gusset configuration overcomes shortfall in the art by providing a stackable product that easily expands to a configuration shown in FIG. 5. The disclosed bottom gusset configuration overcomes shortfall in the art by easily providing a flat configuration as shown in FIG. 4 wherein linear cuts may be made to construct a storage box. The disclosed bottom gusset configuration overcomes shortfalls in the art by striking a fine balance between easy collapse for stacking, an outward bias for expansion and strength in full expansion.

Referring to FIG. 3, an AB box liner system 300 is shown and may comprise an "L" shaped component 310 and a "U" shaped component 330. The AB box liner system, and other systems, may be made from the disclosed laminate system 100 and then processed by use of cutting, sawing or pressing. The prior art has limitations in the attachment of PET films to inner structures such as rigid wadding. The prior art limitations require the use of non-recyclable material. In the presently disclosed embodiments, the film strip or film component may have an amorphous PET on one surface only, such that only one side or one surface may adhere to another object when heat is applied. Thus, the amorphous surface of the film needs to be oriented towards the fiber or rigid wadding (130 FIG. 1) on AB styled pieces.

Referring to FIG. 4, a folded or closed bottom gusset liner 400 is shown with cut lines 410. The execution of the cut lines 410 may result in the bottom gusset liner of FIG. 5.

Figure 5:
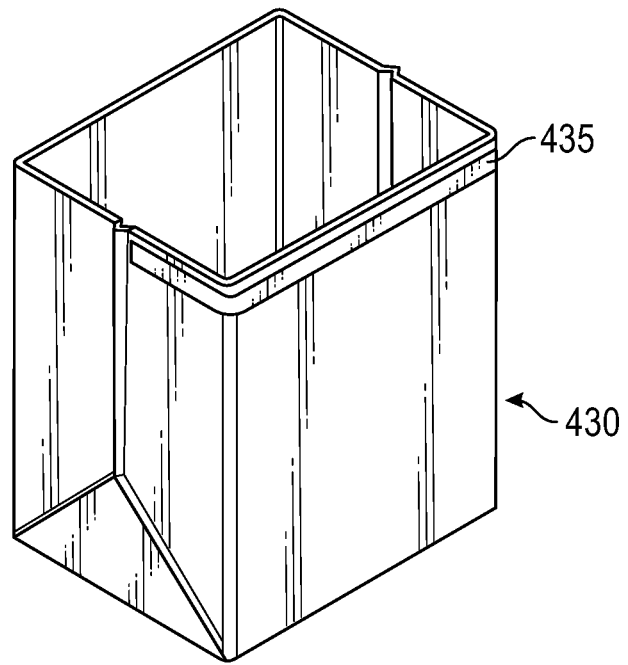
FIG. 5 is a perspective view of a bottom gusset box liner in an expanded position

Referring to FIG. 5, a bottom gusset liner 430 in an expanded position is shown with an optional adhesive closure strip 435. This structure overcomes shortfalls in the art by providing a container that is easily stacked and expanded. The bottom gusset variation requires the amorphous surface to be facing towards the fiber on the resulting exterior and facing away from the fiber on the resulting interior of the bag. Therefore, when heat and pressure is applied to seal the edges of the material the interior film seals to itself where there is an inside fold and the exterior film does not where there is an inside fold. Any fiber between the laminations is compressed to be paper thin and allows the amorphous material from the outer film to reach the surface of the inner film. The resulting bag opens like a grocery bag.

The term homogeneous polyester terephthalate (PET) may include all variants and compositions of PET that satisfies the resin recycling identification code number one.

Figure 6:
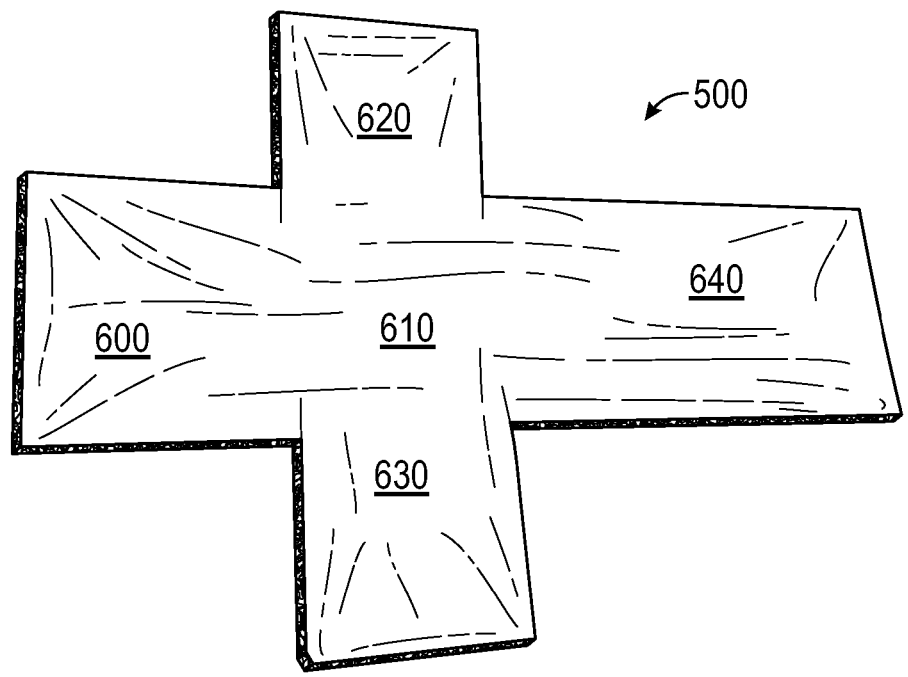
FIG. 6 depicts an isometric view of a disclosed embodiment in an open position

FIG. 6 depicts a disclosed T shaped insulation component 500 in an open position. A disclosed embodiment may comprise one solid body as shown or several components cut to order to maximize material usage. In the shown embodiment, a center section 610 may be placed at the bottom of a container, while the top flap 600, left flap 620 and right flap 630 compose vertical walls within a container. An elongated section, or continuous lower flap and upper cover 640 may be folded during installation and comprise a vertical wall and upper cover.

Figure 7:
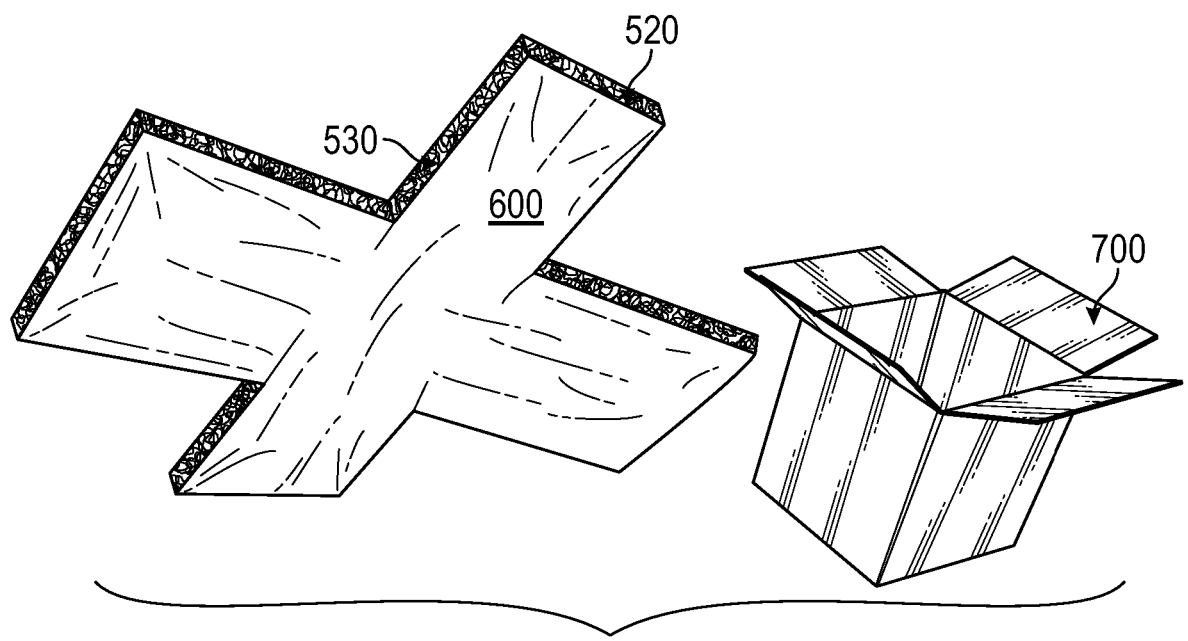
FIG. 7 depicts an isometric view of a disclosed embodiment and a packing box in an open position

FIG. 7 depicts a disclosed embodiment comprising exposed edges 530 of uncovered interior insulation. Two or more sides of the interior insulation may be covered by planar siding 520. A container 700 or box is shown in the background.

Figure 8:
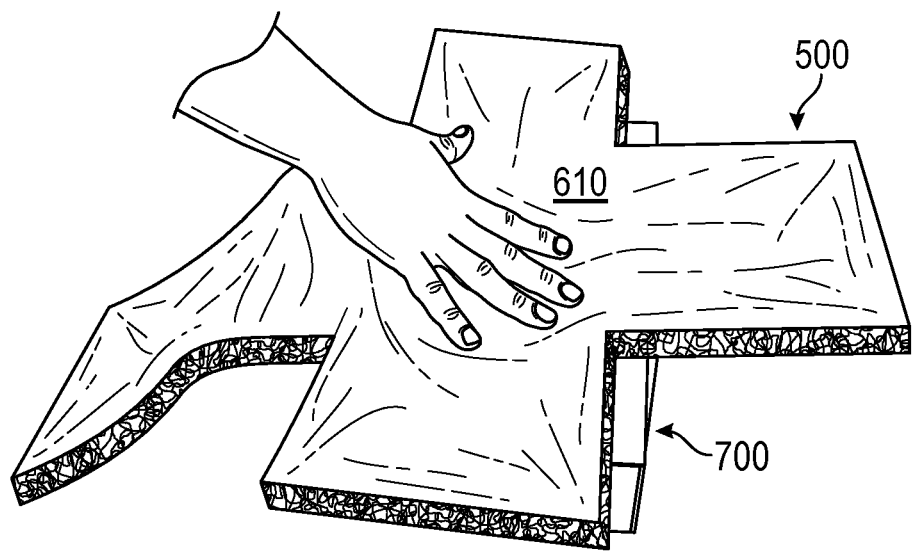
FIG. 8 depicts an isometric view of a disclosed embodiment placed over a packing box

FIG. 8 depicts center section 610 of a disclosed embodiment 500 being pressed or inserted into a container 700.

Figure 9:
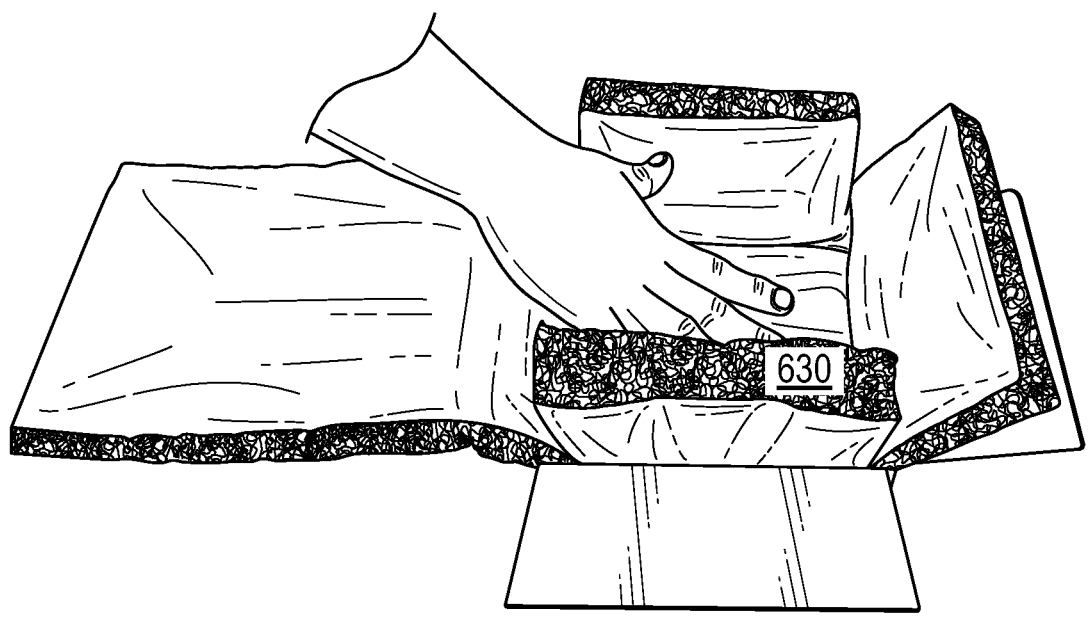
FIG. 9 depicts an isometric view of a disclosed embodiment partially placed within a packing box

FIG. 9 depicts a center section pressed to the bottom of a container and exposed edges 530 of uncovered interior insulation.

Figure 10:
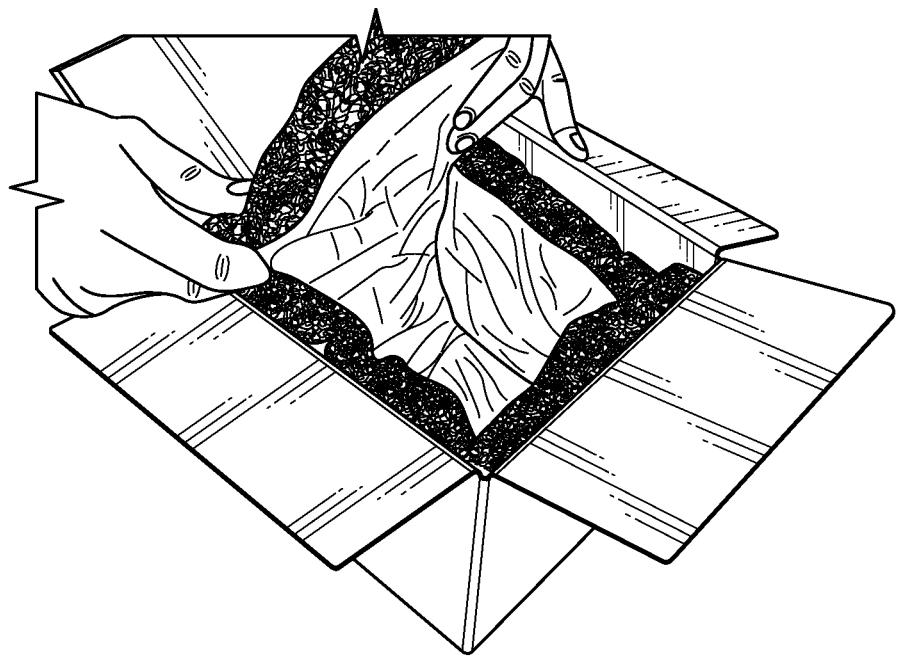
FIG. 10 depicts an isometric view of a disclosed embodiment partially placed within a packing box with the last flap ready for closure

FIG. 10 depicts five of six sides inserted into a container.

Figure 11:
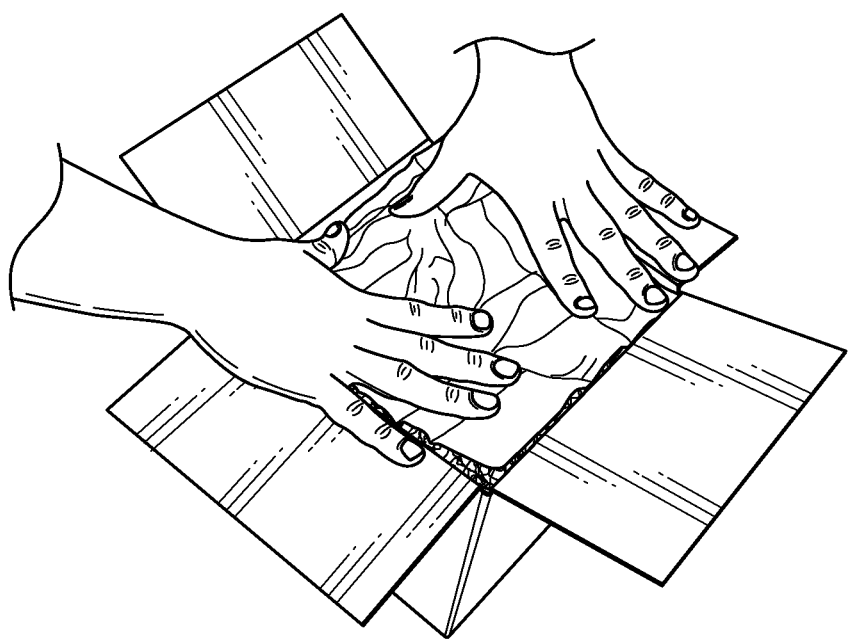
FIG. 11 depicts an isometric view of a disclosed embodiment placed within a packing box

FIG. 11 depicts a disclosed embodiment completely inserted into a container.

Disclosed embodiments include all forms of insulation and containers.

Disclosed embodiments include pouches, comprising laminated PET, of any thickness, with such pouches folded once with edges flat sealed, as in having a bottom gusset liner on three edges and a forth edge comprising an opening that may be sealed so as to avoid exposed fiber edge.

Disclosed embodiments include envelopes which may be similar to the pouches disclosed herein, wherein envelopes may have additional length one surface to form a lip. Such a lip may be fully flat-sealed and be fastened by use of an adhesive strip or other means.

Disclosed embodiments include any three dimensional shape or configuration, such as the "T" shape further disclosed herein. In the construction of non-rectangle shapes, smaller pieces may be seamed together by use of additional PET film to construct living hinges or welds. Such hinges may be offset or reverse fold.

Cut edges may be laminated in an optional secondary process, which may be sometimes referred to as edge banding. Cut edges may be flat-sealed.

Disclosed embodiments may be cut or configured to form any shape, including corrugated carton configurations with optional auto locking features.

Disclosed embodiments may be cut or formed into envelop configurations such as those found in grocery stores and envelopes having clasps.

Disclosed embodiments may be laminated on one or both sides so as to provide an optional thickness or rigidity as to replicate the mechanical strength found in a corrugated box.

Disclosed embodiments may include laminates having a first and second planar side, with one or more of the planar sides cut differently or separately from the fiber. Laminates may have scoring to predict or direct folds. Fiber may be cut partially or fully without cutting the laminate on one side.

Disclosed embodiments may include the use of fiber laminated on one side, and folded such that the laminate faces inwardly, with said folded fiber inserted into a prefabricated PET envelope or pouch. Heat may be applied to the exterior surface of the PET outer surface so as to fuse the pouch to the fiber.

Disclosed embodiments may include or use interior fiber folded in a tube configuration such that the edges meet in the middle of the face of the pouch.

Disclosed embodiments may include the use of a "T" shaped embodiment 500 placed into a container or box, with the box comprising a disclosed bottom gusset system 200.

Disclosed embodiments include the use of hollow fiber form factors in using PET. The hollow fibers may be of any length and overcome shortfalls in the art by providing air gap insulation and weight reduction to the finished product.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

What is claimed is:

1. A laminate system of insulation material made of pure polyethylene terephthalate ("PET") only, the laminate system comprising:
    a first film made of pure PET only;
    a second film made of pure PET only;
    a wadding made of pure PET only;
    wherein the wadding is fastened between the first film and the second film ; and
    wherein the first film comprises a side with amorphous PET facing the wadding, and the
    second film comprises a side with amorphous PET facing the wadding.

2. The laminate system of claim 1, wherein the wadding is fastened between the first film and the second film by adhering to (1) the side of the first film comprising the amorphous PET and (2) the side of the second film comprising the amorphous PET.

3. The laminate system of claim 2, wherein the amorphous PET from the side of the first film and the amorphous PET from the slide of the second film are thermally bonded to the wadding without compromising structural integrity of the wadding.

* * * * *